(12) United States Patent
Sofer et al.

(10) Patent No.: US 7,231,431 B2
(45) Date of Patent: *Jun. 12, 2007

(54) SYSTEM AND METHODS FOR GLOBAL ACCESS TO SERVICES FOR MOBILE TELEPHONE SUBSCRIBERS

(75) Inventors: Carmel Sofer, Motza Elite (IL); Shlomo Wolfman, Hod-HaSharon (IL); Ory Biran, Kiryat Tivon (IL)

(73) Assignee: StarHome GmbH, Zurich (CH)

( * ) Notice: Subject to any disclaimer, the term of this patent is extended or adjusted under 35 U.S.C. 154(b) by 0 days.

This patent is subject to a terminal disclaimer.

(21) Appl. No.: 11/097,189

(22) Filed: Apr. 4, 2005

(65) Prior Publication Data

US 2006/0030304 A1    Feb. 9, 2006

Related U.S. Application Data

(63) Continuation of application No. 09/739,881, filed on Dec. 20, 2000, now Pat. No. 6,920,487.

(60) Provisional application No. 60/171,476, filed on Dec. 22, 1999.

(51) Int. Cl.
*G06F 15/16* (2006.01)

(52) U.S. Cl. .................. 709/218; 709/202; 709/249; 370/401; 455/414.1; 455/432.1

(58) Field of Classification Search ........ 709/202–203, 709/217–219, 238, 249; 370/353–356, 401; 455/414.1–414.2, 432.1–432.3, 433
See application file for complete search history.

(56) References Cited

U.S. PATENT DOCUMENTS

| 5,329,573 | A | 7/1994 | Chang et al. |
|---|---|---|---|
| 5,504,804 | A | 4/1996 | Widmark et al. |
| 5,583,926 | A | 12/1996 | Venier et al. |
| 5,588,042 | A | 12/1996 | Comer |
| 5,689,547 | A | 11/1997 | Mölne |
| 5,751,972 | A | 5/1998 | Quinn et al. |
| 5,815,810 | A | 9/1998 | Gallant et al. |
| 5,859,901 | A | 1/1999 | Brendzel et al. |
| 5,898,922 | A | 4/1999 | Reininghaus |

(Continued)

FOREIGN PATENT DOCUMENTS

CA            2240673           12/1998

(Continued)

OTHER PUBLICATIONS

Smith "An Introduction to GSM Enhancements for Operator Specific Services (CAMEL)", IEE Colloquium on Mobile Communications Towards the Next Millenium and Beyond, IEE, p. 6-1-6-9, 1996. p. 1, Lines 24-27, p. 2, Lines 8-14, p. 4, Lines 19-22, Table 1.

(Continued)

*Primary Examiner*—Bharat Barot

(57) ABSTRACT

A method and a system for providing services to roaming subscribers of mobile telephone networks. The system comprising a packet-switch network and intelligent gateways coupled to the packet-switch network enables roaming subscribers to continue using their value added services using familiar access, interface and language. The system also enables mobile operators to deliver new services to roamers and subscribers.

7 Claims, 6 Drawing Sheets

U.S. PATENT DOCUMENTS

| | | | |
|---|---|---|---|
| 5,915,217 A * | 6/1999 | Wiedeman et al. | 455/427 |
| 5,920,821 A | 7/1999 | Seazholtz et al. | |
| 5,937,053 A | 8/1999 | Lee et al. | |
| 5,949,868 A | 9/1999 | Hamano | |
| 5,974,133 A | 10/1999 | Fleischer, III et al. | |
| 6,038,307 A | 3/2000 | Fahrer et al. | |
| 6,078,655 A | 6/2000 | Fahrer et al. | |
| 6,263,202 B1 | 7/2001 | Kato et al. | |
| 6,363,431 B1 | 3/2002 | Hammer et al. | |
| 6,385,178 B1 | 5/2002 | Palviainen | |
| 6,421,727 B1 | 7/2002 | Reifer et al. | |
| 6,453,174 B1 | 9/2002 | Cunningham et al. | |
| 6,522,876 B1 | 2/2003 | Weiland et al. | |
| 6,542,497 B1 | 4/2003 | Curry et al. | |
| 6,608,832 B2 | 8/2003 | Forslöw | |
| 6,748,229 B1 * | 6/2004 | Calatrava-Requena et al. | 455/466 |
| 6,920,487 B2 * | 7/2005 | Sofer et al. | 709/218 |
| 6,925,299 B1 * | 8/2005 | Sofer et al. | 455/414.2 |
| 6,957,065 B1 * | 10/2005 | Lindholm | 455/433 |
| 6,975,852 B1 * | 12/2005 | Sofer et al. | 455/408 |
| 2002/0012351 A1 | 1/2002 | Sofer et al. | |
| 2004/0224680 A1 | 11/2004 | Jiang | |
| 2005/0070278 A1 | 3/2005 | Jiang | |
| 2005/0186950 A1 | 8/2005 | Jiang | |

FOREIGN PATENT DOCUMENTS

| | | |
|---|---|---|
| CA | 2251501 | 5/1999 |
| EP | 1111945 | 6/2001 |
| EP | 1156692 | 11/2001 |
| WO | WO 96/13949 | 9/1996 |
| WO | WO 97/36432 | 2/1997 |
| WO | WO 97/37502 | 9/1997 |
| WO | WO 98/08354 | 2/1998 |
| WO | WO 98/05181 | 5/1998 |
| WO | WO 98/49860 | 5/1998 |
| WO | WO 99/53698 | 10/1999 |
| WO | WO 99/57874 | 11/1999 |
| WO | WO 99/57914 | 11/1999 |
| WO | WO 00/14992 | 3/2000 |
| WO | WO 00/27144 | 5/2000 |
| WO | WO 2004/014101 | 2/2004 |
| WO | WO 2004/075484 | 2/2004 |
| WO | WO 2004/075579 | 2/2004 |
| WO | WO 2004/075598 | 2/2004 |
| WO | WO 2005/017693 | 2/2005 |
| WO | WO 2005/018245 | 2/2005 |
| WO | WO 2005/081962 | 9/2005 |
| WO | WO 2005/086927 | 9/2005 |

OTHER PUBLICATIONS

Holley "Global System for Mobile Communications—What's in Store?", BT Technology Journal, 14(3): 47-54, 1996. p. 50, 1-h col. §9—p. 54, 1-h col. §9.5, Figs.2, 3.

Mouly et al. "The GSM System for Mobile Communications", p. 46-55, 438-439, 515-545, 554-556, 1992.

\* cited by examiner

SYSTEM AND METHODS FOR GLOBAL ACCESS TO SERVICES FOR MOBILE TELEPHONE SUBSCRIBERS

This is a Continuation of U.S. patent application Ser. No. 09/739,881, filed on Dec. 20, 2000, now U.S. Pat. No. 6,920,487, which claims priority from U.S. Provisional Application No. 60/171,476, filed on Dec. 22, 1999, now expired, the contents of which are hereby incorporated by reference.

BACKGROUND OF THE INVENTION

Mobile subscribers access a variety of value-added services in their home mobile networks. They usually use short codes, thereby enjoying fast and easy-to-remember access. Subscribers use short codes to access services such as voicemail retrieval, customer care service, informational services or virtual private network (VPN) services.

Yet home-network short codes are presently unavailable to subscribers while they are roaming. This situation is due to the complexity of supporting short codes of other operators. Subscribers wishing to access home value added services are, therefore, forced to remember full international telephone numbers. Moreover, they may not be able to access home value added services due to handicaps of international carriers.

Furthermore, global service providers such as airlines companies, international travel agencies, and car rental agencies may offer their customers a local toll free number, however, these numbers are not supported on a global basis due to differences in numbering plans at different networks. Thus, there is a need for a service enabling roaming mobile subscribers access to value added services.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
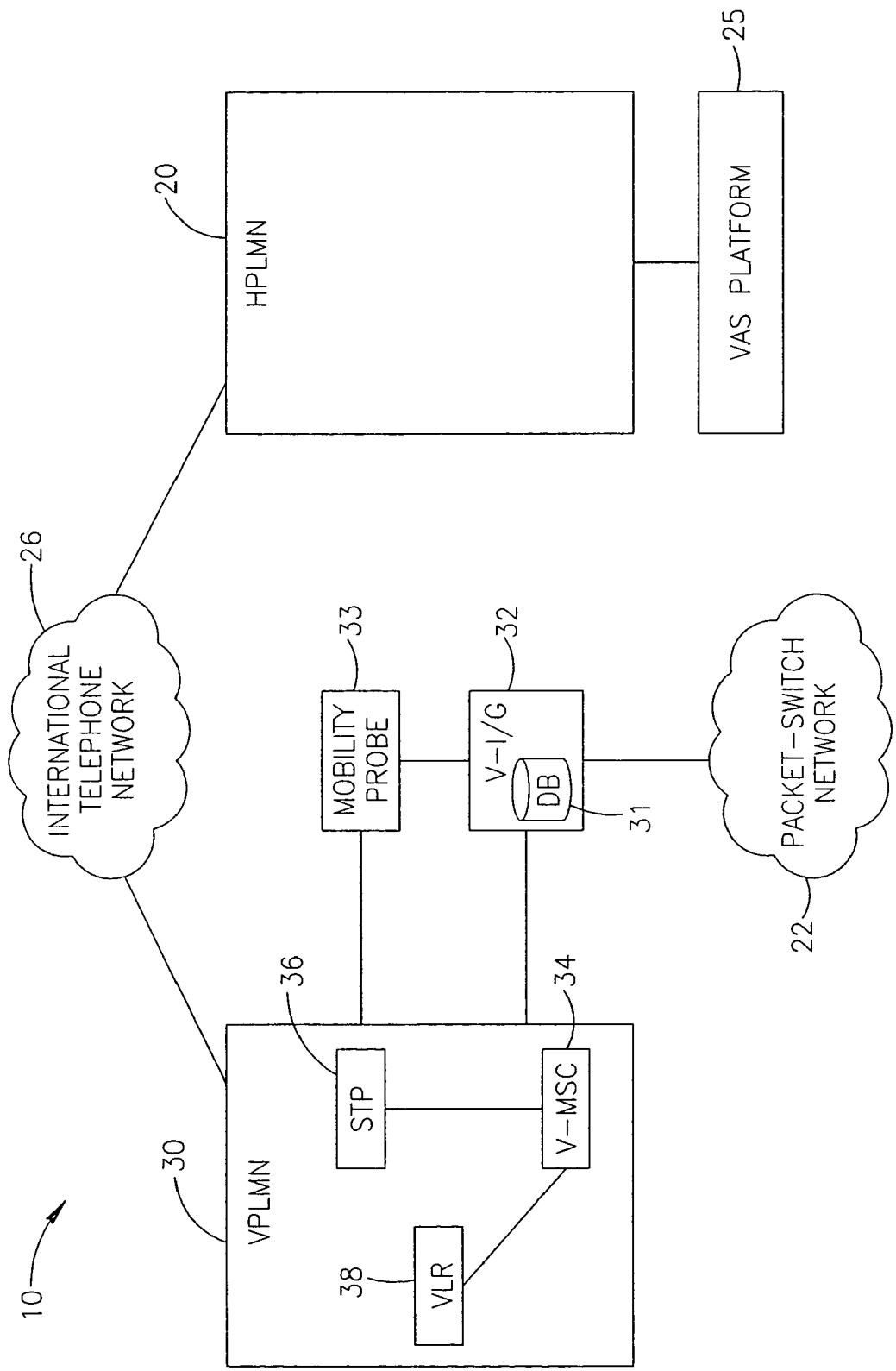
FIG. 1 is a schematic block diagram of a system for providing roaming services in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Some embodiments of the present invention are directed to a method and a system for providing services to roaming subscribers of mobile telephone networks. The system enables roaming subscribers to continue using their home value added services using familiar access, interface, and language. The system also enables mobile network operators to deliver new global services to roaming subscribers all over the world. Non-limiting examples of mobile networks that may provide these services are code division multiple access (CDMA) networks, time division multiple access (TDMA) networks and global system for mobile communications (GSM) networks.

The system providing these services is based upon a configuration comprising a global packet switch network connecting mobile networks via intelligent gateways. This configuration has previously been described in PCT publication WO 99/57914, published Nov. 11, 1999 which is incorporated herein by reference.

Reference is now made to FIG. 1, which presents a general schematic illustration of a system for providing roaming services, according to some embodiments of the present invention. System 10 may comprise a home public land mobile network (HPLMN) 20 and a visited public land mobile network (VPLMN) 30. VPLMN 30 may be coupled to a global packet switch network 22 via a visited intelligent gateway (V-I/G) 32.

V-I/G 32 may comprise a database 31, which may contain replicated data of a central database cached in a management center coupled to global packet switch network 22 (not shown). Database 31 may contain short code translation tables, subscriber profile data and roaming patterns as will be explained in detail hereinbelow. It should be understood that the scope of the present invention is not limited to such a system and the system may comprise other elements as well.

VPLMN 30 and HPLMN 20 may be coupled via an international telephone network 26. HPLMN 20 may be coupled to a value added services platform 25. VPLMN 30 may comprise a visited mobile switching center (V-MSC) 34, a signaling transfer point (STP) 36 coupled to V-MSC 34 and a visited location register (VLR) 38 coupled to V-MSC 34. V-MSC 34 may be coupled to V-I/G 32 by means of signaling interface and full or partial E1 trunks. The signaling interface may be based on System Signaling Number 7 (SS7) and integrated services digital network user part (ISUP) or integrated services digital network (ISDN).

System 10 may further comprise at least one mobility probe 33 coupled to V-IG 32 and to VPLMN 30. Mobility probe 33, which may be controlled by V-I/G 32, is adapted to capture mobility application part (MAP) messages related to the Location Update procedure generated by roaming subscribers while registering to VLR 38. Capturing these messages may enable V-I/G 32 to collect visiting subscriber information, such as mobile subscriber-integrated system digital networks (MS-ISDN) and international mobile subscriber identity (IMSI). The IMSI of a subscriber may be required in order to support roaming services in a mobile-number-portability world and may be useful for billing purposes.

Mobility probe 33 may comprise a high-performance high-impedance SS7 message-capturing device. The location of the capturing operation depends on the specific network configuration and may be at STP 36, at a gateway MSC (not shown) or at any other transit switch. Generally, the point of capturing may be an SS7 link set going through the exit signaling transfer point coupling VPLMN 30 to external signaling networks.

VPLMN 30 may be coupled to a plurality of mobility probes 33 when a plurality of STP's and SS7 link sets, geographically dispersed, connect VPLMN 30 to international telephone network 26.

System 10 may enable providing various services to roamers including short code services. When a roamer at VPLMN 30 dials a short-coded call, V-MSC 34 may route the call to V-I/G 32. V-MSC 34 may route to V-I/G 32 all the short-coded calls dialed by roamers or may route to V-I/G 32 only the short-coded calls that are not recognized as valid at VPLMN 30. V-I/G 32 may translate the short code into a specific destination number according to information stored in database 31 and then may route the call back to V-MSC 34. This specific destination number may be a full destination number, a different short code, or any other dialing sequence.

Figure 2:
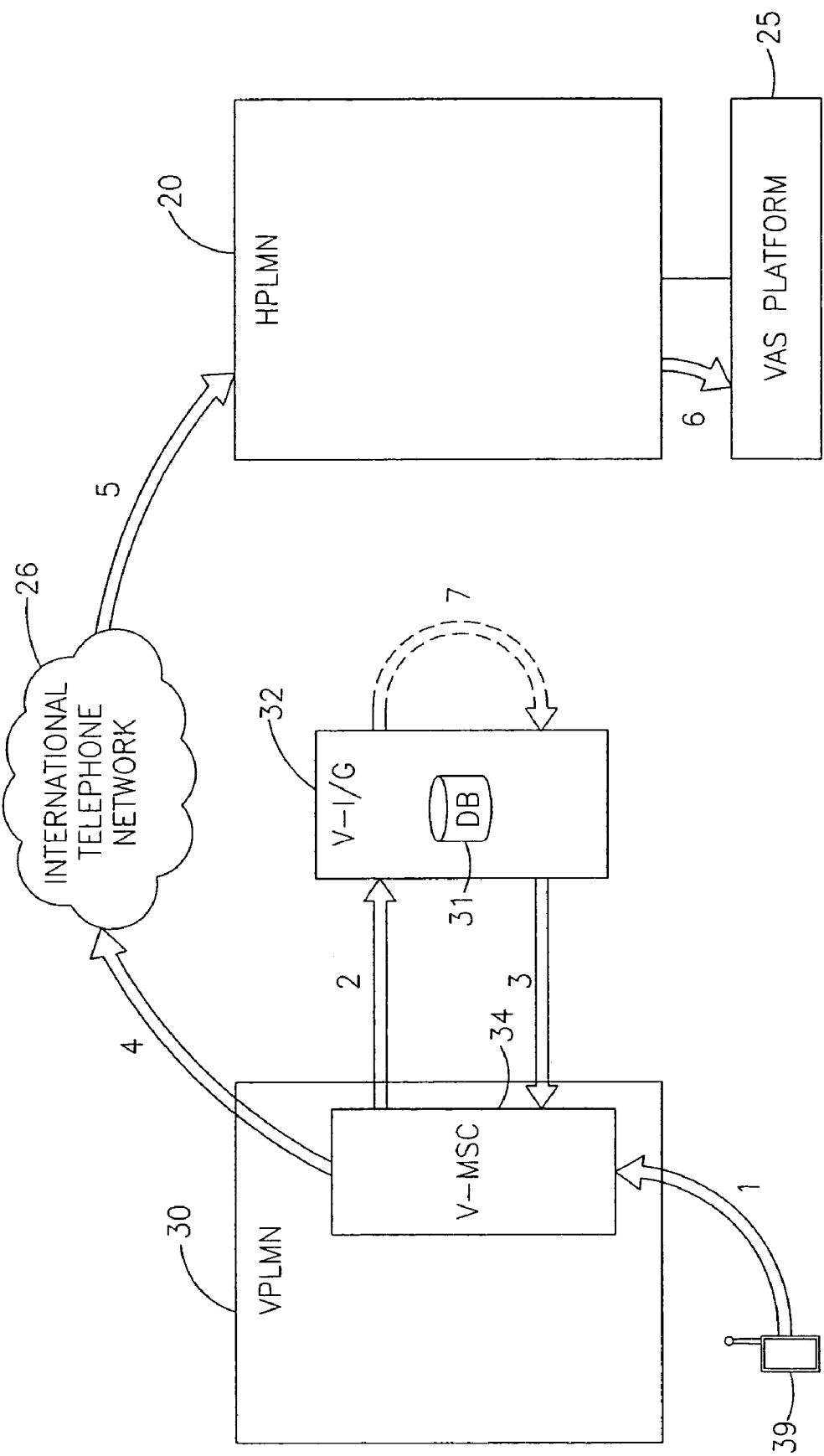
FIG. 2 is a call flow of a short-coded call in accordance with the system of FIG. 1.

Reference is now made to FIG. 2, which illustrates the call flow of a short-coded call or erroneous full number call originated by a roamer at VPLMN 30 of FIG. 1 according to some embodiments of the present invention. In order to simplify the picture, the mobility probe and its interfaces are not shown.

Steps 1 and 2 represent the first leg of the call. When a roamer 39 places a mobile originating call, V-MSC 34 may ask V-I/G 32 to handle the call by routing the call to V-I/G 32 or by making a data query. The data query may be an ISUP query or an intelligent network protocols queries such as INAP, CAP and the like. The mobile originated call may be an alphanumeric short code, a home short code, a VPN short code and the like or an erroneous full number. This step implies that V-MSC 34 is modified by means such as routing tables and IN triggers to enable real-time call control by V-I/G 32.

Various triggering methods may be applied to route the call to V-I/G 32. Non-limiting examples of triggering methods are triggering by Calling Line Identification (CLI) and dialed number (DN), and data query. Non-limiting examples of data query are ISUP and intelligent network (IN) protocols such as INAP, CAP and the like. Various routing rules may be stored in the routing tables of V-MSC 34. Non-limiting examples of routing rules are routing all short-coded calls originated by roamers to V-I/G 32, routing any number, which is invalid for processing by V-MSC 34 to V-I/G 32, and the like.

Step 3 represents the second leg of the call. V-I/G 32 may place an outgoing call on behalf of the roaming subscriber. V-I/G 32 may insert the subscriber's MS-ISDN in the CLI field of the outgoing call set-up signaling. This step may be required when V-MSC 34 does not support call redirection switching. Call redirection switching refers to a process by which V-I/G 32 requests V-MSC 34 to route the call to a specified destination and to release V-I/G 32.

When the call redirection switching is possible, V-I/G 32 may release the call along with a redirection address. The state of the call, prior to the redirection, may be either "established" or "in process". Redirection switching may be desired when the only function of V-I/G 32 is the intelligent translation of the dialed short code number.

Steps 4 and 5 represent the third leg of the call. V-MSC 34 may route the call via international telephone network 26 to HPLMN 20. The destination address of the call is an access number to value added services platform 25 of HPLMN 20. It should be noted that it is most probable that the roaming subscriber's CLI is not delivered to HPLMN 20 via international telephone network 26.

Step 6 represents the local call generated by HPLMN 20 to value added services platform 25. The actual connection of the first and the second leg following a successful access to platform 25 (illustrated by optional step 7) may be performed when V-MSC 34 does not support redirection switching. The connection may be enabled via the internal call switching of V-I/G 32.

Figure 3:
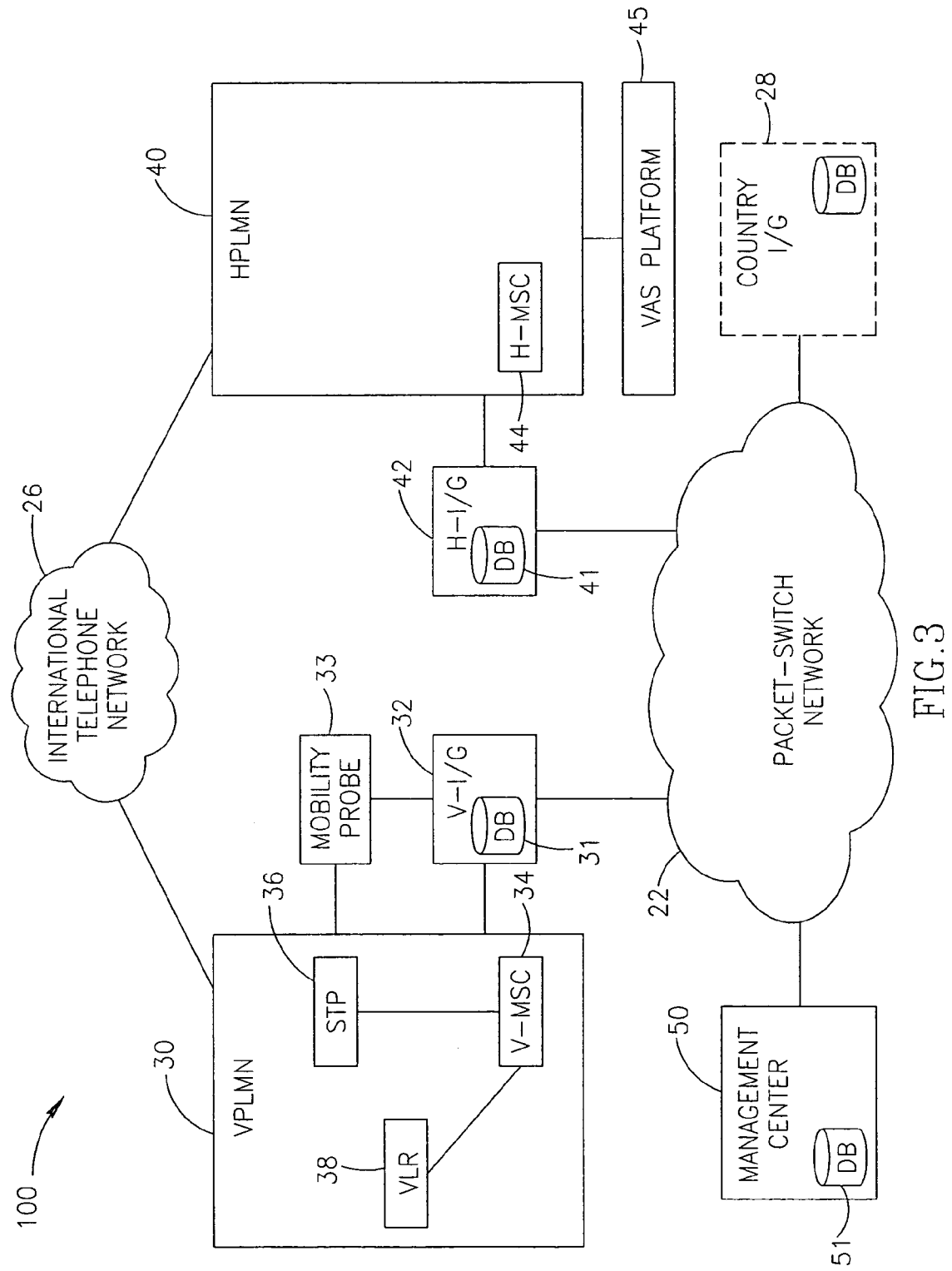
FIG. 3 is a schematic block diagram of a system for providing roaming services in accordance with some embodiments of the present invention.

Reference is now made to FIG. 3, which presents a schematic illustration of a system for providing roaming services, according to some embodiments of the present invention.

In system 100, HPLMN 40, which replaces HPLMN 20 of FIG. 1, is coupled to global packet switch network 22 via a home intelligent gateway (H-I/G) 42. System 100 may further comprise a management center 50 coupled to global packet switch network 22. Management center 50, which controls the platform and monitors elements of system 100 may comprise a central database 51. Database 51 may contain translation tables of short codes to long numbers, configuration requirements of the system, user profile data, special routing instructions for a specific global short code, instructions for the intelligent call assistance service and the like. Non limiting examples of user profile data are the user's operator, the country of the operator, membership at clubs, preferred language and the like.

HPLMN 40 may comprise a home-MSC (H-MSC) 44 and may be coupled to a value added services platform 45.

H-I/G 42 may comprise a database 41, which contains replicated data of central database 51. Local databases 41 and 31 may be updated on a regular basis via global packet switch network 22. V-I/G 32 and H-I/G 42 may comprise additional databases such as a subscriber database caching only subscribers' profile data and a visitor database caching only roamers' profile data.

System 100 may enable the exchange of user related information between mobile networks, such as the CLI and the DN, via global packet switch network 22. Voice information optionally may be conveyed via global packet switch network 22, for example using voice over internet protocol, as will be described with respect to FIG. 5.

Figure 4:
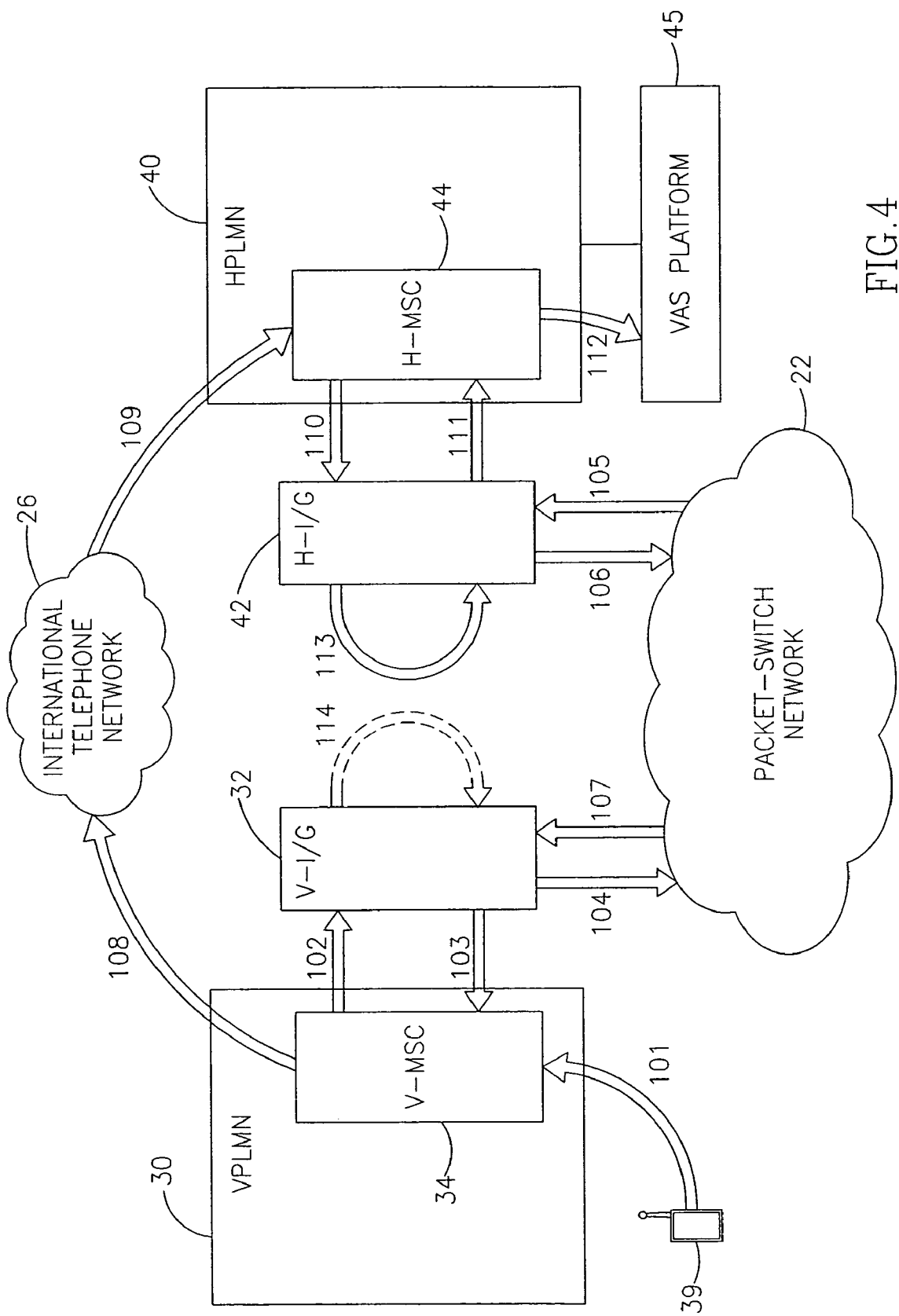
FIG. 4 is a call flow of a short-coded call in accordance with the system of FIG. 3.

Reference is now made to FIG. 4, which illustrates the call flow of a short-coded call originated by a roamer at VPLMN 30 of FIG. 3 according to some embodiments of the present invention. In order to simplify the picture, the mobility probe and its interfaces are not shown.

Steps 101, 102 and 103 are similar to steps 1, 2 and 3 of FIG. 2. Steps 104, 105, 106 and 107 illustrate the utilization of global packet switch network 22 to transfer data from VPLMN 30 to HPLMN 40. V-I/G 32 sends the subscriber's CLI, DN and possibly other relevant parameters to H-I/G 42 (steps 104 and 105) to be synchronized with the voice call (illustrated by steps 108 and 109). Delivering the CLI may enable a roamer access to home value added services in a virtual home environment. H-I/G 42 in return allocates voice resources and updates V-I/G 32 (steps 106 and 107).

Steps 108 and 109 represent the international leg. The destination address of this call is H-I/G 42 according to the number provided to V-I/G 32 by H-I/G 42 as illustrated in steps 106 and 107. Accordingly, the call is routed from H-MSC 44 to H-I/G 42 as illustrated by step 110.

Steps 111 and 112 represent the local call to value added services platform 45. H-I/G 42 performs synchronization of data provided via the global packet switch network (CLI and DN) and the telephone voice call provided via the international leg (SYNC IP/TEL process). Merging the CLI and the DN with the international leg may enable the emulation of a local subscriber access to value added services platform 45.

Step 113 represent the actual connection between the incoming and outgoing legs of H-MSC 44 (steps 110 and 111) following a successful access to platform 45. Optional step 114 represents the actual connection of the first and the second leg of V-MSC 34 and may be performed when the redirection switching is not applicable.

Referring back to FIG. 3, system 100 may optionally comprises a country I/G 28 coupled to global packet switch network 22. Country I/G 28 enables a subscriber of HPLMN 40 roaming at a network which is not connected to global packet switch network 22 to access home value added services at virtual home environment.

Figure 5:
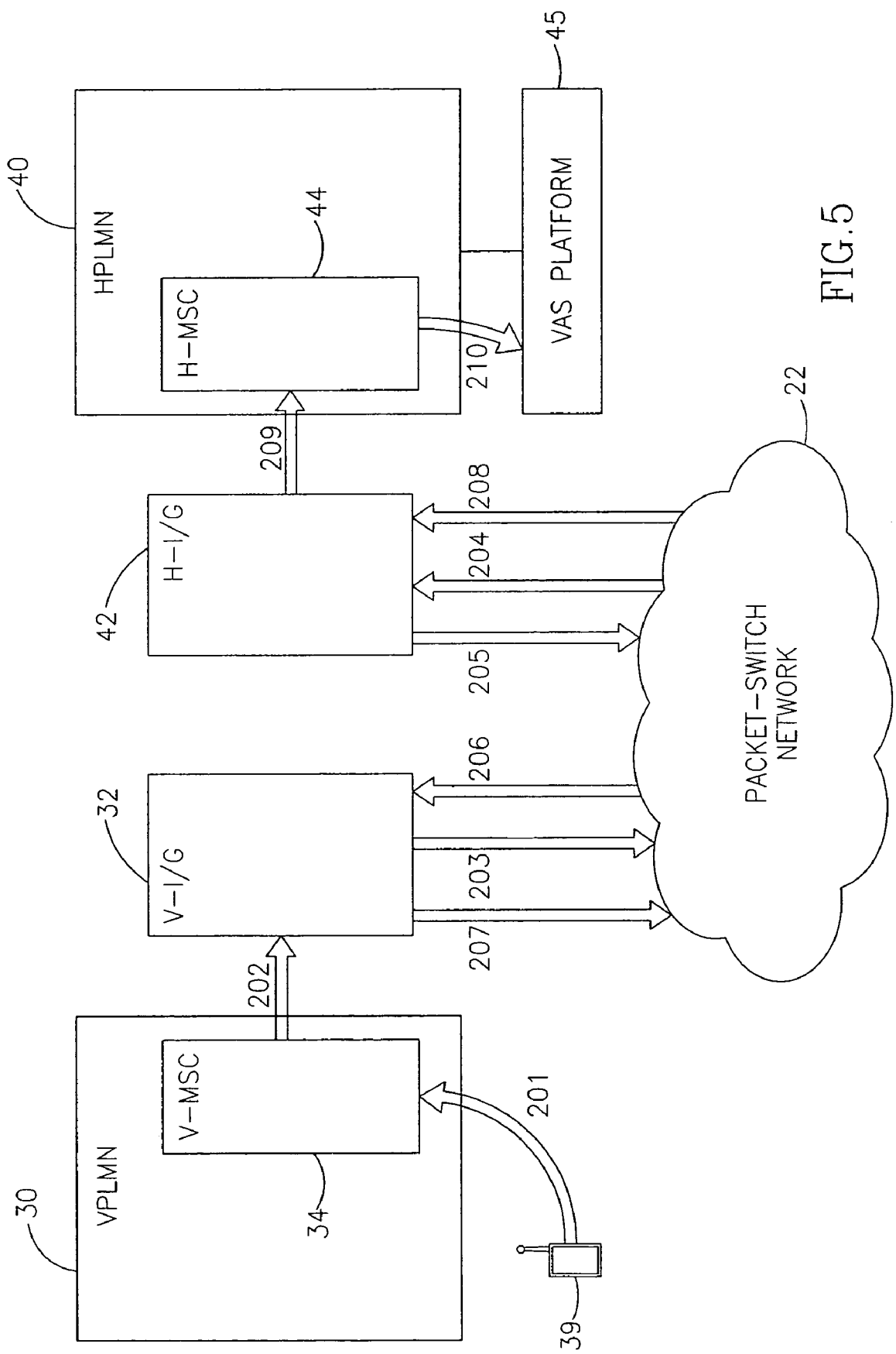
FIG. 5 is a call flow of a short-coded call utilizing voice transfer via the global packet switch network in accordance with the system of FIG. 3.

Reference is now made to FIG. 5, which illustrates the call flow using Voice over Internet Protocol (VoIP) according to some embodiments of the present invention. Voice information is transferred between a roamer and home value added services platform 45 via global packet switch network 22 using VoIP technology.

Steps 201 and 202 are similar to steps 1 and 2 of FIG. 2. Steps 203, 204, 205 and 206 are similar to steps 104, 105, 106 and 107 of FIG. 4. V-I/G 32 sends the subscriber's CLI, DN and possibly other relevant parameters to H-I/G 42 via global packet switch network 22 (steps 203 and 204) to be synchronized with the voice call (illustrated by steps 207 and 208). H-I/G 42 in return may allocate global packet switch network resources and updates V-I/G 32 as illustrated by steps 205 and 206. In these embodiments, the voice call is also being sent over global packet switch network 22.

Steps 207 and 208 represent the voice call. V-I/G 32 routes the call via global packet switch network 22, utilizing VoIP technology. Steps 209 and 210 are similar to steps 111 and 112 of FIG. 4.

Many services and applications may be provided to mobile subscribers using the above embodiments. Some services may be provided by the VPLMN to roamers, other services may be provided by the HPLMN to subscribers roaming elsewhere, while a further set of services is global in nature and may be provided by a PLMN to its subscribers as well.

Home Short Code service, associated home short code, global short code service, generic short codes and International Virtual Private Network (VPN) are some services that involve translation of short codes. The home short code service provides mobile phone subscribers a virtual home environment by enabling the usage of home-based short codes.

The associated home short code service enables a roamer to use a home short code providing access to a service provider such as emergency service and to get access to a similar local service provider.

International VPN service enables roaming subscribers to continue using their home dialing extensions of the VPN while roaming. The international VPN service treats the VPN extensions as regular short codes and translates the short code to a full destination number as explained hereinabove. The translation may be performed at H-MSC 44 or at H-I/G 42. When databases 51, 31, and 41 contains a list of the VPN subscribers, including their user profile, other services such as a welcome SMS service and intelligent call assistance may be provided as part of the VPN service.

A supplementary service to the international VPN is the global VPN. The global VPN service may enable a global organization having local mobile VPN's supported by different mobile operators to virtually converge them into one global VPN.

The global short code service is a global service targeted to globally brand-named organizations that want to give their customers an easy way to contact them all over the world. It is also targeted to local service providers of universal services such as taxi stations, information centers, and the like.

The system may provide service providers a short code that is easy to remember and intuitive, such as the digits corresponding to the name or trademark of the company providing the service. Each digit of a standard telephone corresponds to three Latin letters. For example, digit 2 corresponds to A, B and C. The system may enable mobile phone users to rent a car from Hertz by dialing 43789 (HERTZ), to check their credit balance with Visa by dialing 8472 (VISA), to confirm airline reservations with TWA by dialing 892 (TWA) or to order a taxi by dialing 8294 (TAXI).

The translation of the alphabet into digits is also directed to the generic short code service. The generic short-code service may enables a mobile user to dial a generic short code in order to get access to a certain service when he does not prefer any specific service provider. For example, the user may dial 8294 (TAXI) to order a taxi.

Services related to short codes use translation tables, which are cached in central and local databases. The local databases contain "short codes translation" tables and "collision resolution" tables and algorithms. The collision resolution tables and algorithms determine the routing of short coded calls having short codes, which may be translated to more than one destination number.

When a home short code, a visited short code or a global short code are identical, but point to distinctly different value added services, the collision may be resolved by routing the call to the local value added service, to the home network value added service or to the global service. Another option may be to open an Interactive Voice Response (IVR) session and to offer the subscriber a choice between the options.

The Global Short Code service may allow global accessibility for globally brand-named service providers. The system may provide a unique global mobile-number to global service providers by translating a global short code into a destination number enabling the users of the service provider an easy access to that service wherever they are. The service may be provided by a PLMN to roamers and local subscribers.

The actual destination number may be different in different countries for providing access to the service provider's branches. The destination number, when dialing the same short code, may be different for different callers according to their user profile. For example, a call dialed by a frequent flyer of an airline company may be routed to a different destination number than a call from a regular customer. Moreover, the destination numbers may vary according to a predefined schedule. For example, a call dialed at noon may be routed to a different destination number than a call dialed at midnight.

The global short code may be translated into a specific destination number according to the service provider's request and may be transferred to a predefined destination. This global number may enable a user of the global service to reach the service, as per its routing preferences, while roaming at any network and at any technology.

Figure 6:
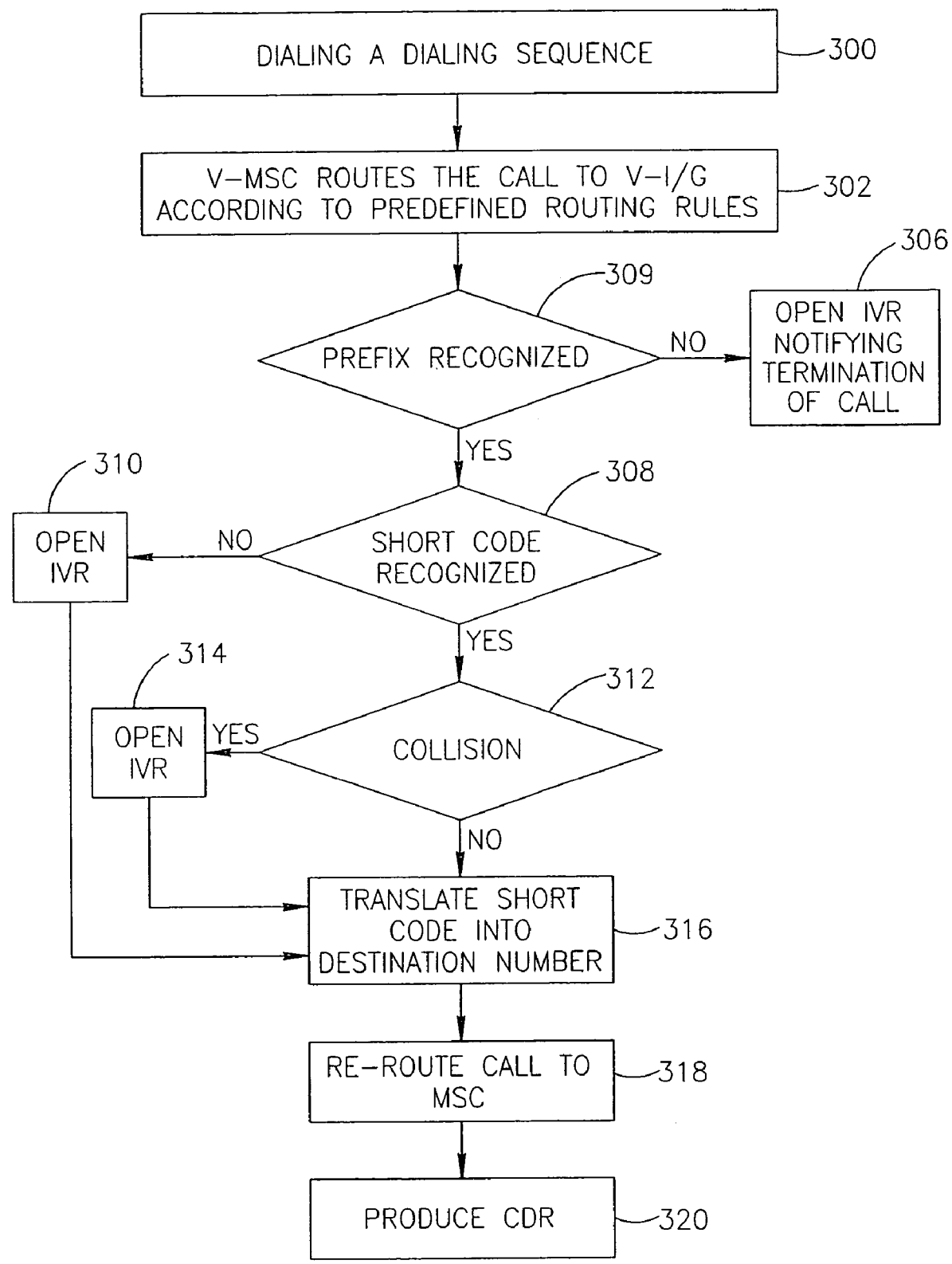
FIG. 6 is a flowchart illustration of a method for providing a Global Short Code service according to some embodiments of the present invention.

Reference is now made to FIG. 6, which is a flowchart illustration of a method for providing short coded services according to some embodiments of the present invention. A caller at VPLMN 30 may dial a short code (step 300). V-MSC 34 may route the call to V-I/G 32 according to predefined routing rules (302).

Next, V-I/G 32 may check whether the roaming caller network prefix is recognized (step 304). If the network prefix is not supported by database 31, the system may open an interactive voice response (IVR) session, notifying the roamer that the service is not supported and the call is terminated (step 306).

If the network prefix is recognized, V-I/G 32 may check whether the dialing sequence is a recognized short code stored in database 31 (step 308). If not, the system may open an interactive voice response (UVR) session, which provides the user possibilities to choose the desired dialing sequence (step 310). Then V-I/G 32 may check whether the short code may be translated to more than one destination number due to collisions between different kinds of short codes, such as a local short code, a home short code, a global short code and the like (step 312).

If there is a collision, V-I/G 32 may open an IVR session, that enables the user to choose the desired destination. The IVR session may be provided in the user's preferred language, based on the user's IMSI (step 314). The system may be able to offer the service provider an IVR session as a default option whenever the user dials a global short code, in order to manually select a preferred routing.

The system may provide the option of distinguishing between subscribers of a service and non-subscribers and may route their calls differently according to predefined instructions from the service provider.

Accordingly, V-I/G 32 checks whether for the desired global short code there are specific instructions for routing and translate the short code into the corresponding destination number (step 316). The database of each V-I/G contains the required information of each service and the identification of subscribers according to their MS-ISDN and the like.

The database may be updated directly from the customer system or in any other suitable way. In a case of non-subscription based service, no additional user profile database is required. After finding the desired full number to which the call is destined, V-I/G 32 re-routes the call to V-MSC 34 for the completion of the call in a conventional way or, if supported, using the call redirection switching capability (step 318). At the end of the call, V-I/G 32 produces a rated call details record (CDR) and sends it to network management center 50 via global network 22 (step 320).

The system may offer the service provider with several abilities for routing and completing of the global short code call, among them: Connection to a "fixed" DN as per the service provider's request, regardless of the location of the end user and its origin network and routing to a specific number based on the user's location. The system may also support a combination of the above options, therefore routing the same global short code to different locations based on several parameters.

It should be noted that routing might be flexible and variable according to a predefined schedule so that the destination numbers may be different at various hours within a day and various days within a week. It should be noted that I/G might provide identification of mobile user through CLI. For example, a service provider may require to route all the calls to a call center and to be able to identify the user when he reaches the operator. In these cases, the system may use the SYNC/IP TEL option, namely, re-routing the call to the mobile operator and delivering the CLI via global packet switch network 22.

Outbound Notification Short Message Service (SMS), welcome SMS, and global SMS involve transfer of data via global packet switch network and may serve to promote and improve the short codes services. SMS enable both visited and home network operators to deliver messages to inbound and outbound roaming subscribers in the subscriber's preferred language.

The welcome SMS may enable mobile network operators to greet inbound roamers upon registering. Using mobility probe 33, V-I/G 32 may receive notification regarding roamers' registrations. This information, in addition to the subscriber's CLI, may enable the VPLMN operator to offer friendly promotional messages about available services to roamers, such as the availability of short code services or other relevant local information.

The outbound notification SMS service may enable mobile network operators to contact their subscribers while roaming elsewhere. Providing that H-I/G 42 is coupled to a mobility probe at HPLMN 40, it may trigger SMS for HPLMN 40, which then may offer access information about home value added services or any other information to subscribers roaming elsewhere.

The global SMS messaging service may enable third party organizations to deliver a global service via SMS utilizing the global packet switch network 22 and the system-guaranteed SMS bandwidth. This bandwidth may be created by means of cooperation and interface between S-MSCs of PLMNs. Third party organizations may deliver SMS-based messages to individuals, groups, or an entire mailing list.

The intelligent call assistance involves using information stored in local databases. Intelligent call assistance helps inbound roamers to complete their calls including home short-coded calls whenever they encounter dialing difficulties.

The intelligent call assistance service may assist roamers to complete calls whenever they encounter situations of unfamiliar dialing sequences. The intelligent call assistance service may act automatically according to predefined rules and may provide assistance in the roamer's preferred language to enable the completion of the call. Some examples of certain features of the service are described herein, however it should be understood to those skilled in the art that many more features may be provided by the intelligent call assistance service.

Many roamers do not know that they are required to dial "+" or "00" or some other prefix in order to make an international call. The intelligent call assistance service may identify such an attempt to dial an international call (at least 9 digits) and may assist to complete the call by adding automatically the required prefix.

The intelligent call assistance service is also adapted to identify an invalid local call (6–8 digits) and to assist the roamer to make the call. The intelligent call assistance service may provide a prompt notifying the roamer about the dialing rules of the specific country in a preferred language.

A person of ordinary skill in the art will appreciate that other services related to short codes, call assistance, and SMS messages may be provided to mobile users in accordance with embodiments of the present invention.

It should be understood to a person skilled in the art that many other services such as wireless application protocol (WAP) access and mobile e-commerce may be provided using the embodiments of the present invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system comprising;
a first intelligent gateway configured for coupling to a packet-switch network, said packet switch network being coupled to other intelligent gateways, said other intelligent gateways being respectively coupled to other mobile networks,
said first intelligent gateway being coupled to a first mobile network and adapted to provide a roaming mobile device connecting as a visitor in said first mobile network with access to a plurality of services, said services being at least associated with one of said other mobile networks, said one mobile network being a home mobile network of said roaming mobile device, wherein some of said plurality of services are integrated with one another, and wherein said first intelligent gateway comprises a gateway database comprising a profile of said roamer for use by said intelligent gateway when providing access to said plurality of services.

2. The system of claim 1, wherein said services include access to voice mail.

3. The system of claim 1, wherein said intelligent gateway is further configured to send call control parameters via said packet switched network in parallel to connection of a corresponding call over an International telephony connection, said intelligent gateway being arranged to configure said call control parameters for reconnection with said corresponding call at a called network.

4. The system of claim 3, wherein said call control parameters comprises a caller line identification (CLI).

5. The system of claim 1, wherein said intelligent gateway is configured to unite call control parameters received over said packet switch network with a corresponding call made over an international telephony connection.

6. The system of claim 5, wherein said intelligent gateway is further configured to route the telephony call containing the call control parameters to a destination indicated in the parameters.

7. The system of claim 6, wherein said call control parameters comprise a caller line identification (CLI).

* * * * *